United States Patent
Mao

(10) Patent No.: US 12,511,621 B2
(45) Date of Patent: Dec. 30, 2025

(54) SYSTEMS AND METHODS FOR DATA MART RATIONALIZATION

(71) Applicant: BANK OF MONTREAL, Toronto (CA)

(72) Inventor: Vinnie Wan Lei Mao, Toronto (CA)

(73) Assignee: BANK OF MONTREAL, Toronto (CA)

(*) Notice: Subject to any disclaimer, the term of this patent is extended or adjusted under 35 U.S.C. 154(b) by 0 days.

(21) Appl. No.: 17/891,684

(22) Filed: Aug. 19, 2022

(65) Prior Publication Data

US 2022/0391844 A1 Dec. 8, 2022

Related U.S. Application Data

(63) Continuation of application No. 17/003,432, filed on Aug. 26, 2020, now Pat. No. 11,429,931.

(Continued)

(51) Int. Cl.
*G06F 16/215* (2019.01)
*G06F 16/22* (2019.01)
(Continued)

(52) U.S. Cl.
CPC ........... *G06Q 10/10* (2013.01); *G06F 16/215* (2019.01); *G06F 16/2282* (2019.01); *G06F 16/27* (2019.01); *G06Q 30/0201* (2013.01)

(58) Field of Classification Search
CPC .. G06Q 10/10; G06Q 30/0201; G06F 16/215; G06F 16/2282; G06F 16/27
See application file for complete search history.

(56) References Cited

U.S. PATENT DOCUMENTS 8,290,951 B1 * 10/2012 Joa .................. G06Q 40/02
707/754
8,630,890 B2 * 1/2014 Au .................. G06F 16/2465
705/28

(Continued)

OTHER PUBLICATIONS

Arrosoft Partners with Trusted Data Solutions to Enhance Legacy Data Transformation Services: TDS' Evolve Archive Migration Solutions and Restoration Assurance Program Further Arrosoft Services. PR Newswire [New York] Jan. 23, 2019.*

(Continued)

*Primary Examiner* — Timothy Padot
(74) *Attorney, Agent, or Firm* — Foley & Lardner LLP

(57) ABSTRACT

Disclosed herein are embodiments of systems, methods, and products comprises an analytic server for data rationalization and migration. The server receives data from a plurality of electronic data sources and stores the received data into a database within a central hub. The server demobilizes the data and performs enhancement on the data to prepare the data for complex calculation. The server copies the enhanced data to an operational data store, performs various calculation functions that filer, rationalize the data, and create data linkage. The server copies back the calculation result to the database for further processing and downstream consumption. The calculation results provide a consolidated view of data from different source systems and satisfy the reporting needs for different consumers. The server uses common data model to generate reports for different consumers. After the data migration and consolidation into a central hub, the server decommissions legacy components.

18 Claims, 4 Drawing Sheets

Related U.S. Application Data

(60) Provisional application No. 62/891,810, filed on Aug. 26, 2019.

(51) Int. Cl.
*G06F 16/27* (2019.01)
*G06Q 10/10* (2023.01)
*G06Q 30/0201* (2023.01)

(56) References Cited

U.S. PATENT DOCUMENTS

| | | | | |
|---|---|---|---|---|
| 9,460,171 | B2* | 10/2016 | Marrelli | G06F 16/258 |
| 11,163,446 | B1* | 11/2021 | Wils | G06F 16/2358 |
| 2003/0033240 | A1* | 2/2003 | Balson | G06Q 40/06 |
| | | | | 705/37 |
| 2003/0088562 | A1* | 5/2003 | Dillon | G06F 16/30 |
| | | | | 707/999.005 |
| 2005/0243604 | A1* | 11/2005 | Harken | G06F 8/51 |
| | | | | 365/185.22 |
| 2005/0262190 | A1* | 11/2005 | Mamou | G06Q 10/10 |
| | | | | 709/203 |
| 2007/0011134 | A1* | 1/2007 | Langseth | G06F 16/254 |
| 2007/0142925 | A1* | 6/2007 | Heinzmann | G06F 16/24532 |
| | | | | 700/28 |
| 2008/0235249 | A1* | 9/2008 | Stephens | G06Q 10/10 |
| 2011/0047176 | A1* | 2/2011 | Hoffman | G16H 50/20 |
| | | | | 707/769 |
| 2012/0110390 | A1* | 5/2012 | Grube | G06F 11/0727 |
| | | | | 714/E11.179 |
| 2012/0221577 | A1* | 8/2012 | Fuh | G06F 16/22 |
| | | | | 707/E17.089 |
| 2013/0262406 | A1* | 10/2013 | Kumar | G06F 16/215 |
| | | | | 707/692 |
| 2014/0040182 | A1* | 2/2014 | Gilder | G06F 16/256 |
| | | | | 707/602 |
| 2014/0344297 | A1* | 11/2014 | Jayade | G06Q 10/06316 |
| | | | | 707/755 |
| 2015/0134589 | A1* | 5/2015 | Marrelli | G06F 16/254 |
| | | | | 707/602 |
| 2018/0196745 | A1* | 7/2018 | Karr | G06F 16/1727 |
| 2021/0065116 | A1 | 3/2021 | Mao | |

OTHER PUBLICATIONS

S. Ma et al., "Banking Comprehensive Risk Management System Based on Big Data Architecture of Hybrid Processing Engines and Databases," 2018 IEEE SmartWorld/SCALCOM/UIC/ATC/CBDCom/IOP/SCI, Guangzhou, China, 2018, pp. 1844-1851.*

DB2 migration without tears. Davis, Leila. Datamation 37.n9: p. 67(3). Reed Business Information, Inc. (US). (May 1, 1991).

Examination Report for CA 3091204 dated Oct. 13, 2021 (3 pages).

Foreign Action other than Search Report on CA 3091204 dated Jun. 13, 2022 (3 pages).

Make Technologies—Transformational Legacy Modernization. Published May 19, 2005. Retrieved from http://web.archive.org/ web/20050519151303/www .maketechnologies.com/fi les/P D F/TransformationalLegacyModernization_Jan05 .pdf.

CA Office Action for Application No. CA3208838 mailing date Apr. 10, 2025, 4 pages.

* cited by examiner

SYSTEMS AND METHODS FOR DATA MART RATIONALIZATION

CROSS-REFERENCE TO RELATED APPLICATIONS

This application is a continuation application of U.S. patent application Ser. No. 17/003,432, filed Aug. 26, 2020, which claims priority to U.S. Provisional Application No. 62/891,810, filed Aug. 26, 2019, which are incorporated by reference herein in their entirety for all purposes.

TECHNICAL FIELD

This application relates generally to methods and systems for data mart rationalization and mitigation.

BACKGROUND

Large organizations may have complex infrastructures containing interconnected distributed resources. For example, a modern day enterprise may have multiple departments and divisions with each division having its own data system, databases, and system architecture including internal and external sources and protocols. The data generated and/or consumed by these different systems may be in different and incompatible data formats. Data management in such large enterprises may be challenging due to the large number of different data sources and data formats used by each data source.

Conventional software solutions for enterprise data management have several technical shortcomings. For example, to make data from different source systems compatible, the conventional solutions may have to spend significant time and processing power comparing the data from different systems and transforming fields and tables of the data. Because in many circumstances the data obtained from multiple internal and external sources use inconsistent terms and formats to describe the data content itself, conventional software solutions have been incapable of comparing data, exchanging data, automating business processes, and/or obtaining correct data feed for complex applications. As a result, conventional software solutions for enterprise data management are inefficient, inaccurate, and cumbersome. Furthermore, the above-described process may consume large amount of processing power, which is highly undesirable. In addition, to retrieve and load data from different source systems may require expensive licenses, which makes the conventional solutions uneconomical.

SUMMARY

For the aforementioned reasons, there is a need for a computer-implemented system and method that enables accurate and efficient data analysis and management for large enterprises that may have many data sources. Embodiments disclosed herein address the above challenges by migrating the data from different electronic data sources into a database in a central hub to generate a whole data image covering every spectrum of the different data sources with proper data linkage. As a result, the database of central hub may provide a consolidated view of data from different electronic data sources and may satisfy needs for different consumers. Therefore, the embodiments disclosed herein may save effort, streamline development, and enable faster analytics for enterprise data management.

In an embodiment, a method comprises receiving, by a server, data from a plurality of electronic data sources, the received data corresponding to inconsistence data formats, each electronic data source having a legacy component configured to generate calculation results based on data corresponding to that electronic data source; storing, by the server, the received data into a first database by combining the received data from the plurality of electronic data sources and generating an index table of the received data; executing, by the server, a data enhancement protocol on the received data within the first database by tagging the received data with metadata to prepare the received data for calculations, the metadata corresponding to a source of origin and timestamp of the received data; replicating, by the server, the enhanced data into a second database; executing, by the server, an application in the second database, the application configured to perform a set of calculation functions on the enhanced data to generate calculation results by removing duplicated information and creating data linkage by associating relevant information in the enhanced data; replicating, by the server, the calculation results back to the first database, the calculation results comprising a consolidated view of the data from the plurality of electronic data sources, whereby the data from the plurality of electronic data sources are located in the first database with data linkage; generating, by the server, an electronic report for different consumers using a common data model based on calculation results in the first database, wherein the common data model comprises a collection of data schemas representing commonly used concepts; and decommissioning, by the server, each legacy components corresponding to each electronic data source.

In another embodiment, a server comprises a processor and a non-transitory computer-readable medium containing instructions that when executed by the processor cause the processor to perform operations comprising receive data from a plurality of electronic data sources, the received data corresponding to inconsistence data formats, each electronic data source having a legacy component configured to generate calculation results based on data corresponding to that electronic data source; store the received data into a first database by combining the received data from the plurality of electronic data sources and generating an index table of the received data; execute a data enhancement protocol on the received data within the first database by tagging the received data with metadata to prepare the received data for calculations, the metadata corresponding to a source of origin and timestamp of the received data; replicate the enhanced data into a second database; execute an application in the second database, the application configured to perform a set of calculation functions on the enhanced data to generate calculation results by removing duplicated information and creating data linkage by associating relevant information in the enhanced data; replicate the calculation results back to the first database, the calculation results comprising a consolidated view of the data from the plurality of electronic data sources, whereby the data from the plurality of electronic data sources are located in the first database with data linkage; generate an electronic report for different consumers using a common data model based on calculation results in the first database, wherein the common data model comprises a collection of data schemas representing commonly used concepts; and decommission each legacy components corresponding to each electronic data source.

In another embodiment, a computer system comprises a plurality of electronic data sources each having a legacy component configured to generate calculation results based on data corresponding to that electronic data source; and a server in communication with the plurality of electronic data sources, wherein the server is configured to receive data from the plurality of electronic data sources, the received data corresponding to inconsistence data formats, store the received data into a first database by combining the received data from the plurality of electronic data sources and generating an index table of the received data; execute a data enhancement protocol on the received data within the first database by tagging the received data with metadata to prepare the received data for calculations, the metadata corresponding to a source of origin and timestamp of the received data; replicate the enhanced data into a second database; execute an application in the second database, the application configured to perform a set of calculation functions on the enhanced data to generate calculation results by removing duplicated information and creating data linkage by associating relevant information in the enhanced data; replicate the calculation results back to the first database, the calculation results comprising a consolidated view of the data from the plurality of electronic data sources, whereby the data from the plurality of electronic data sources are located in the first database with data linkage; generate an electronic report for different consumers using a common data model based on calculation results in the first database, wherein the common data model comprises a collection of data schemas representing commonly used concepts; and decommission each legacy components corresponding to each electronic data source.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
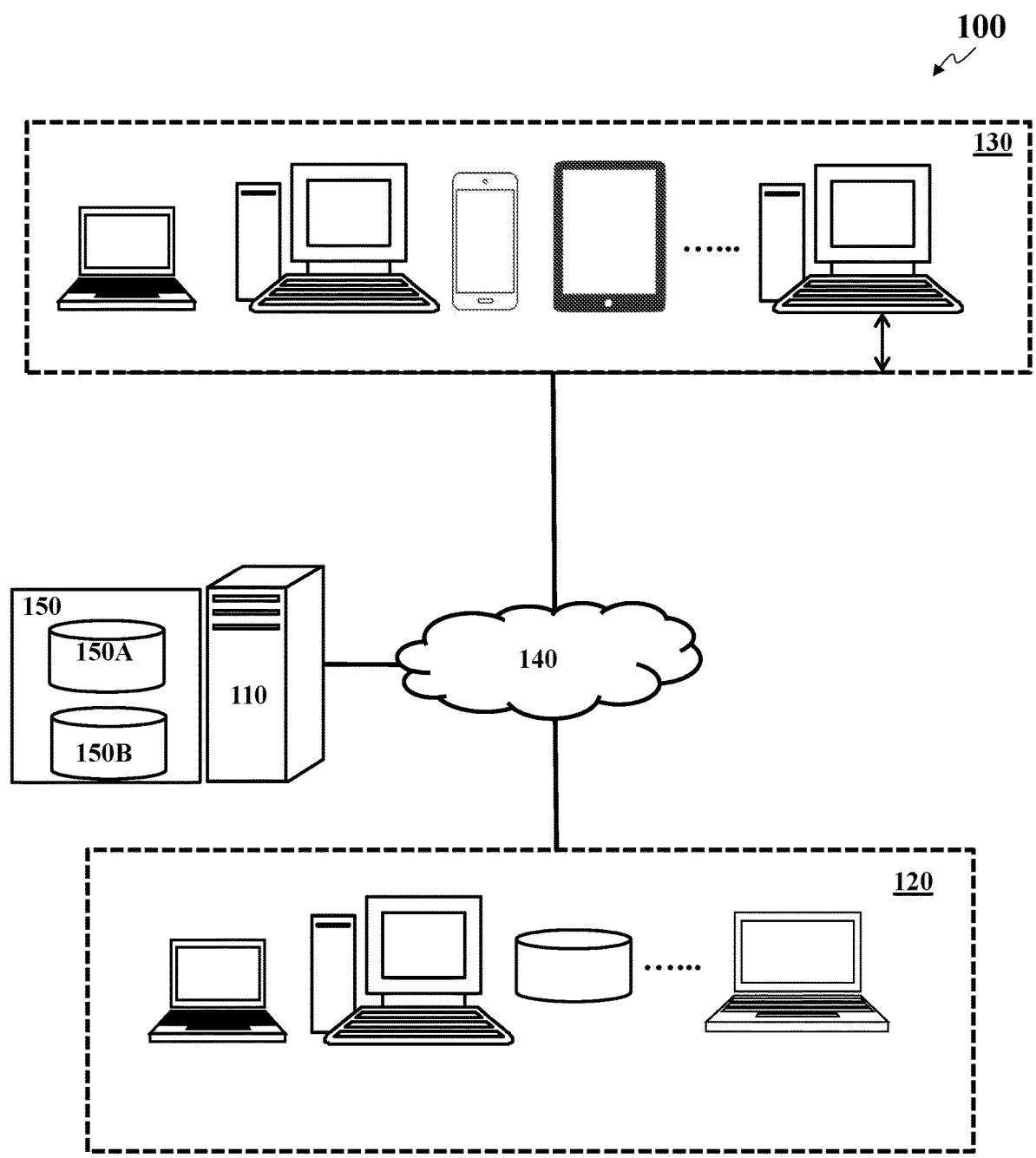
FIG. 1 illustrates a computer system for data mart rationalization and mitigation, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein provide a system and method for data rationalization and migration to enable efficient and fast data analysis and management. Specifically, an analytic server may receive data from a plurality of electronic data sources. The received raw data may be in different topics and/or in different forms containing inconsistent terms and definitions. The analytic server may perform initial processing on the received data by combining the data and store the combined data as level 1 data in a database within a central hub. The level 1 data may be mobilized data. The analytic server may demobilize the data and perform enhancement on the received data to upgrade the level 1 data to level 3 data, which are more appropriate for complex calculation. The analytic server may copy the enhanced data to an operational data store (ODS) and execute Basel application to perform a set of calculation functions. The Basel application may filter, rationalize the data, and create proper data linkage. The analytic server may copy back the calculation results to the database for further processing and downstream consumption. The calculation results may provide a consolidated view of data from different source systems and may satisfy the reporting needs for different consumers. The analytic server may use common data model to generate reports for different consumers. After the data migration and consolidation into a central hub, the analytic server may decommission legacy components.

FIG. 1 illustrates components of a system 100 for data mart rationalization and mitigation, according to an embodiment. The system 100 may comprise an analytic server 110, an information delivery platform (IDP) 150, a set of electronic data sources 120, and a set of consumer devices 130 that are connected with each other via hardware and software components of one or more networks 140. The IDP 150 may be a central hub comprising a database 150A and an operational data store (ODS) 150B. The analytic server 110 may comprise, or may be in networked-communication with the IDP 150. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, configured to rationalize and migrate data received from the set of electronic data sources 120. The analytic server 110 may be logically and physically organized within the same or different devices or structures, and may be distributed across any number of physical structures and locations (e.g., cabinets, rooms, buildings, cities). The analytic server 110 may receive data from a plurality of electronic data sources 120. The analytic server may migrate the data from different electronic data sources 120 into a database 150A in the IDP central hub 150 to generate a whole data image covering every spectrum of the different electronic data sources with proper data linkage. As a result, the database of IDP central hub 150 may provide a consolidated view of data from different electronic data sources 120 and may satisfy needs for different consumer devices 130.

The set of electronic data sources 120 may be any computing system and/or non-transitory machine-readable storage medium configured to store data. The set of electronic data sources 120 may contain data associated with different departments within an organization. For example, individual departments and divisions within an organization/enterprise may independently build their own systems to source, model, manage and store data. As a result, an enterprise may have a large number of distributed electronic data sources 120 covering the whole spectrum of an enterprise's business, including market sources, lending sources, financing sources, and the like. The data from different electronic data sources 120 may be in different topics and/or in different forms containing inconsistent terms and definitions.

The analytic server may receive data from the set of electronic data sources 120, migrate, and consolidate the different pieces of data including corporate & commercial (CC) data, retail (P&C) data, enterprise data warehouse (EDW) data into the IDP central hub 150. More specifically, the analytic server may perform initial processing on the received data by combining the data and store the combined data as level 1 data in the database 150A within the IDP central hub 150. The level 1 (L1) data may be mobilized data. The analytic server may demobilize the data and perform enhancement on the received data to upgrade the level 1 data to level 3 (L3) data, such as Basel staging L3 views. Basel staging L3 view data may be stored in a staging area of the database 150A. The staging area acts as a large "bucket" in which data from multiple source systems can be temporarily placed for further processing. The analytic server 110 may tag data in the staging area with additional metadata indicating the source of origin and timestamps indicating when the data was placed in the staging area. Level 3 data may be higher-level enhanced data that are more appropriate for complex calculation.

The analytic server 110 may copy the enhanced data (e.g., Basel staging L3 view data) within the database 150A to the operational data store (ODS) 150B and perform a set of calculation functions. The ODS 150B is a database designed to integrate data from multiple sources for additional operations on the data, for reporting, controls and operational decision support. The analytic server 110 may execute Basel application to filter, rationalize the enhanced data within the ODS 150B and create proper data linkage. As a result, after the various calculation functions of the Basel application, the analytic server 110 may obtain calculation results.

The analytic server 110 may copy back the calculation results to the database 150A for further processing and downstream consumption. Specifically, the analytic server 110 may store all the calculation results into the database 150A and generate Basel L3 views of the data. Basel L3 views are views mainly for particular consumers. After the analytic server 110 stores the calculation results back to the database 150A, the data from different source systems are located in a single central hub with proper data linkage.

The database 150A may be any non-transitory machine-readable media configured to store data, such as a Netezza® database. Netezza databases have a strong ability in loading and streaming data. The data within the database 150A may be initially in level 1, and go to level 3. Level 3 may comprise Basel staging L3 views and Basel L3 views. L1 data may be mobilized data. The analytic server 110 may demobilize the data and perform enhancement to enable L1 data go to Basel staging L3 views, which are more appropriate for complex calculation. After the analytic server 110 copies the Basel staging L3 view data into ODS 150B and performs various calculations by executing Basel application, the analytic server 110 may obtain the calculation results and store the calculation results in the database 150A as Basel L3 views, which are views for particular consumers.

The analytic server 110 may use common data model (CDM) to generate reports for different consumers based on the Basel L3 view data in the database 150A. The CDM is a standardized, modular, and extensible collection of data schemas to build, use, and analyze data. The collection of predefined schemas consists of entities, attributes, semantic metadata, and relationships. The schemas represent commonly used concepts and activities to simplify the creation, aggregation, and analysis of data. Because the database 150A in the IDP central hub 150 includes data from different electronic data sources 120 and have proper data linkage, the IDP central hub 150 may enable more efficient and faster analytics. In addition, the Basel L3 views of the database 150A are views for particular consumers, the analytic server 110 may extract the common data elements in CDM quickly, cleanly, and with confidence to generate reports satisfying different consumers' needs. Furthermore, the analytic server 110 may rewrite Ab Initio extraction scripts in the Netezza database 150A according to the extraction operation for generating reports.

The analytic server 110 may decommission legacy components. A legacy component/system is an old method, technology, computer system, or application program, of a previous or outdated computer system, yet still in use. The analytic server 110 may use some initial tools including some legacy components and systems for data loading and data instruction. After the data migration and consolidation into the IDP central hub 150, the analytic server 110 may decommission such legacy components. While the Basel application performs various calculation functions to prepare the data for migration, the analytic server 110 may decommission the Basel application after the migration of the data into the IDP central huh 150.

The set of consumer devices 130 may be any computing device allowing a consumer to interact with the analytic server 110 over the network 140. The consumer devices 130 may be any electronic device comprising a processor and non-transitory machine-readable storage medium. The examples of the computing device may include, but are not limited to, a desktop computer, a laptop, a personal digital assistant (PDA), a smartphone, a tablet computer, and the like. The consumer devices 130 may comprise any number of input and output devices supporting various types of data, such as text, image, audio, video, and the like. A consumer operating the consumer device 130 may issue an electronic request to the analytic server 110. The request may request the analytic server to generate a report for the particular consumer. For example, the analytic server 110 may provide a web application that allows the consumer to issue the request. The consumer may input attributes of the requested data by interacting with a graphical user interface (GUI) of the web application. The analytic server 110 may access the database 150A to retrieve the requested data based on the consumer's request attributes, generate the report using the retrieved data, and transmit the generated report to the consumer device 130.

Figure 2:
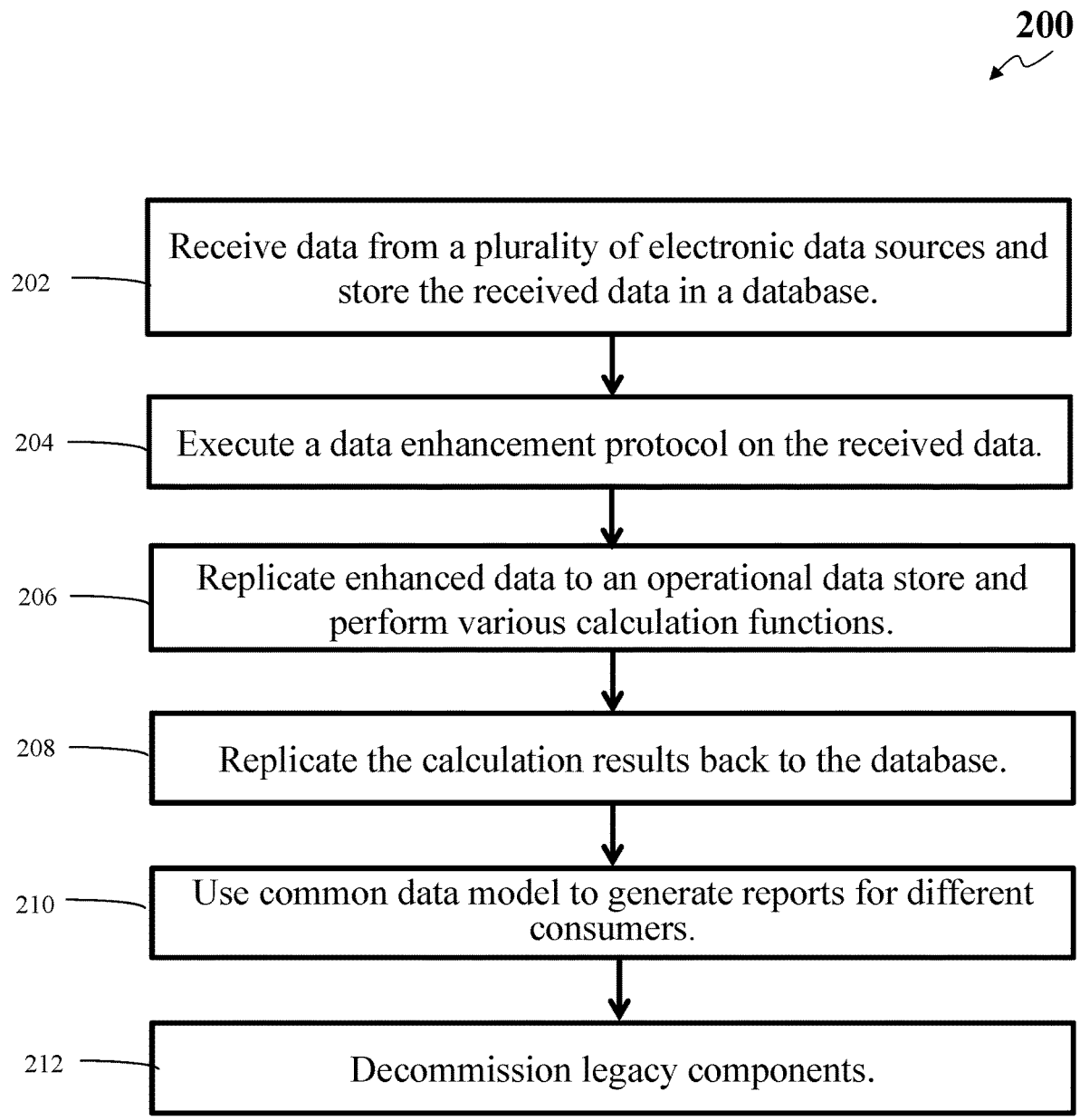
FIG. 2 illustrates a flowchart depicting operational steps for data mart rationalization and mitigation, according to an embodiment.

FIG. 2 illustrates execution of a method 200 for data mart rationalization and mitigation, according to an embodiment.

Other embodiments may comprise additional or alternative steps, or may omit some steps altogether.

At step 202, the analytic server may receive data from a plurality of electronic data sources and store the received data in a database. The data may be various data feeds from different vendors, different departments, and/or different data marts. The data mart is a subset of the data warehouse and is usually oriented to a specific business line or team. For instance, a data mart may refer to all data from a sales department including retail data. Whereas data warehouses have an enterprise-wide depth, the information in data marts pertains to a single department. In some deployments, each department or business unit may be the owner of its data mart including all the hardware, software and data. This enables each department to isolate the use, manipulation and development of their data.

As a result, the data from different electronic data sources may be in different topics and/or in different forms containing inconsistent terms and definitions. Each electronic data source having a legacy component configured to generate calculation results based on data corresponding to that electronic data source. The analytic server may receive data from all source systems covering the whole spectrum of an enterprise's business, including market sources, lending sources, financing sources, and the like. The goal of the analytic server may be to migrate and consolidate the different pieces of data including corporate and commercial (CC) data, retail (P&C) data, enterprise data warehouse (EDW) data received from different sources into a central hub (e.g., a smart core hub), which is called information delivery platform (IDP). The analytic server may use the central hub as one single source for reporting. The central hub may comprise a database, such as a Netezza database. Netezza databases are based on technology that designs and markets high-performance data warehouse appliances and advanced analytics applications for uses including enterprise data warehousing, business intelligence, predictive analytics and business continuity planning. Netezza databases have a strong ability in loading and streaming data. For example, Netezza databases may load/stream data in terabytes.

The analytic server may perform initial processing on the received data by, combining the raw data of the received data from different electronic data sources and generate a book of record, which may be an index table of the received data. For example, the analytic server may combine the received data by tagging and indexing the received data with other data attributes, such as the original department name, the original database name, and the like associated with the received data. The analytic server may store the book of record of the received data in the database (e.g., Netezza database) as level 1 data. Level 1 data may be low-level data that are mobilized.

At step 204, the analytic server may execute a data enhancement protocol on the received data. The analytic server may process the received data by performing data enhancement and data enrichment to upgrade the received data from level 1 to level 3, such as Basel staging L3 views. Basel staging L3 view data may be stored in a staging area. One of the primary functions performed by a staging area is consolidation of data from multiple source systems. In performing this function, the staging area acts as a large "bucket" in which data from multiple source systems can be temporarily placed for further processing. The analytic server may tag data in the staging area with additional metadata indicating the source of origin and timestamps indicating when the data was placed in the staging area.

A non-limiting example of data enhancement protocol may be generating a curated dataset that uses a unified data format/definition that is compatible with different computing systems/sources described herein. For instance, different computing systems (e.g., legacy system and/or different third party/vendor systems) may analyze data associated with the same product. However, because each system generates results in accordance with its own configurations, the results of each system may have different names, even though they might be related to the same product code. The data enhancement protocol generates a common/unified name for different files created that correspond to the same product code. Enhancing the data in this way allows for faster and more efficient processing.

Level 3 data may be higher-level enhanced data that are more appropriate for complex calculation. For example, if the source data received from different sources have many identifiers (Ms), but do not have a name. The analytic server may demobilize the received source data to determine the data relationships of source data from different sources and prepare the data for complex calculation.

At step 206, the analytic server may replicate the enhanced data to an operational data store (ODS) and perform a set of calculation functions. An ODS is a database designed to integrate data from multiple sources for additional operations on the data, for reporting, controls and operational decision support.

The analytic server may transfer common staging table instrument data (e.g., Basel staging L3 view data from step 204) to the ODS and execute Basel application. The Basel application may comprise a set of calculation functions including SS/HSS key cutting; LEN, product GL, RC, transit mapping; pre-reconciliation validations & calculations (e.g., 4 key validations, AOS/contr netting); invoke BWAR reconciliation; perform netting & collateral allocation; invoke risk parameters calculation; process Bayview data (lending); process GE data (lending); Adjustments.

The analytic server may execute the Basel application to obtain Basel calculation results by filtering and rationalizing the enhanced data and creating proper data linkage. As a result, the analytic server may generate a combination of different data from different source systems by removing duplicated information and associating relevant information in the received data.

The Basel application may interact with a risk calculator. The calculation results may comprise risk parameters. The analytic server may use Basel application with ODS to run complex business logic. The analytic server may use Basel application to replace costly Ab Initio scripts and non-standard AIX machines. Each step within the Basel application may be executed only if it has not been performed to completion by the source system. Non-limiting examples of risk parameters may include probability of default, loss given default, exposure at default.

In a non-limiting example, the analytic server may execute a message call to a common exposure at default and/or loss given default calculator. The calculator may only accept conformed and enhanced data (e.g., facility or collateral and guarantor data that has been enhanced using the methods and systems described herein) and may calculate a loss given default value (e.g., secured and/or unsecured, downturn and long run loss given default reporting). At step 208, the analytic server may replicate the calculation results back to the database for further processing and downstream consumption. Specifically, the analytic server may store all the calculation results into the database and generate Basel L3 views of the data. Basel L3 views are views mainly for particular consumers. After the analytic server stores the calculation results back to the central hub (e.g., the Netezza database), the data from different source systems are located in a single central hub with proper data linkage and in consistent forms. The embodiments disclosed herein may use PowerDesigner® to store all the metadata and data linkage.

The analytic server may be able to use the signal central hub for different applications and downstream consumptions. For example, the analytic server may perform further data processing on the L3 data in the central hub and generate various reports for different consumers. After the migration, the analytic server may generate a whole data image that covers every spectrum of different electronic data sources, including corporate & commercial (CC) data, retail (P&C) data, enterprise data warehouse (EDW) data, and the like. As a result, the database of central hub may provide a consolidated view of data from different source systems and may satisfy the reporting needs for different consumers. For example, the analytic server may use the signal central hub database to generate reports for consumers including different line of business risk reporting tools, such as EDW (enterprise data warehouse) data consumers, Basel data consumers, CAMS (continuous monitoring and risk scoring), CDM/MSBI, BCL/BCS, depicted in FIG. 3.

Because the database in the central hub includes data from different source systems and have proper data linkage, the central hub may enable more efficient and faster analytics. For example, when a user faces challenges with data from different systems that should work together, the user may retrieve the required data from the database of central hub directly without having to spend significant time and effort transforming fields and tables of the data to make them work together. As a result, the embodiments disclosed herein may save effort, streamline development, and enable faster analytics.

At step 210, the analytic server may use common data model (CDM) to generate reports for different consumers. The analytic server may generate the reports for different consumers by extracting data from the L3 data (e.g., calculation results replicated back to the database) based on a set of report attributes. The analytic server may extract the common data elements in CDM quickly, cleanly, and with confidence for different apps to generate the reports. In addition, the analytic server may rewrite Ab Initio extraction scripts in the Netezza database according to the extraction operation.

Ab software specializes in high-volume parallel data processing applications and enterprise application integration. These applications perform functions relating to fourth generation data analysis, batch processing, complex events, quantitative and qualitative data processing, data manipulation graphical user interface ((IUI)-based parallel processing software which is commonly used to extract, transform, and load (ETL) data. To extract data and generate reports for different consumers, the analytic server may need to rewrite the corresponding Ab initio extraction scripts based on the extraction operations satisfying the different consumers' needs.

The CDM is a standardized, modular, and extensible collection of data schemas to build, use, and analyze data. The collection of predefined schemas comprises entities, attributes, semantic metadata, and relationships. The schemas represent commonly used concepts and activities to simplify the creation, aggregation, and analysis of data.

The CDM simplifies data management and app development by unifying data into a known form and applying structural and semantic consistency across multiple apps and deployments. In other words, if the data is in the CDM, the analytic server can use the data in many apps, streamline the creation or use of other apps to use that data, and easily build reports for each of those apps (or all of them). In addition, data integrators who bring data from a variety of systems can focus on landing the data in the CDM, instead of building a different model for each app.

By using the CDM to generate the reports, the analytic server may offer the following benefits: structural and semantic consistency across applications and deployments; simplified integration and disambiguation of data collected from processes, digital interactions, product telemetry, people interactions, and the like; a unified shape where data integrations can combine existing enterprise data with other sources and use that data holistically to develop apps or derive insights; ability to extend the schema and CDM entities to tailor the CDM to any organization or consumer.

At step 212, the analytic server may decommission legacy components. A legacy component/system is an old method, technology, computer system, or application program, of a previous or outdated computer system, yet still in use. The analytic server may use some initial tools including some legacy components and systems for data loading and data instruction, which may require a very expensive license. After the data migration and consolidation into a central hub, the analytic server may decommission such legacy components and save money on the license. While the Basel application performs various calculation functions to prepare the data for migration, the analytic server may decommission the Basel application and the legacy components corresponding to the plurality of electronic data sources after the migration of the data into the central hub.

Figure 3:
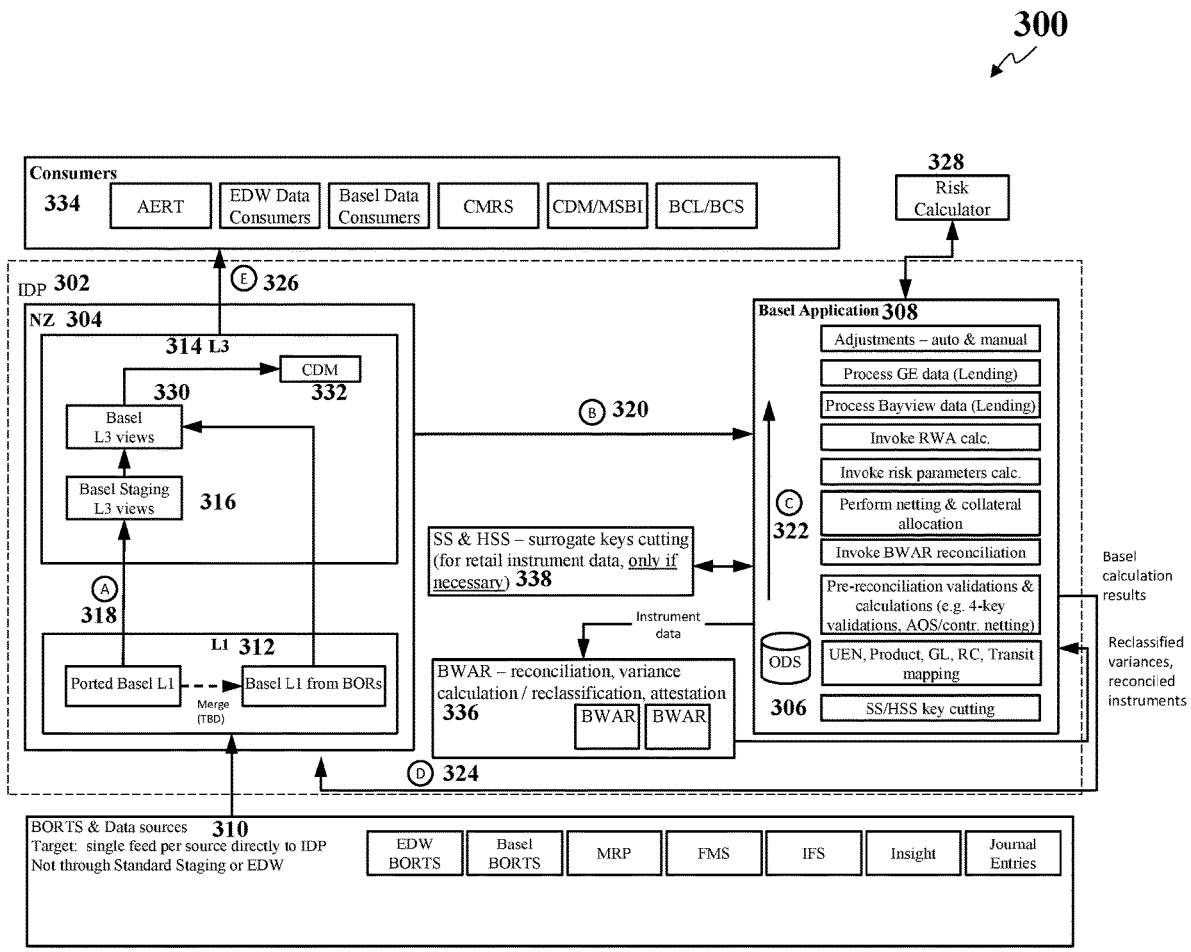
FIG. 3 illustrates a first example of data mart rationalization and mitigation, according to an embodiment.

FIG. 3 illustrates a first example of data mart rationalization and mitigation, according to an embodiment. This example may be a high-level solution architecture for corporate and commercial (CC) Basel.

The analytic server may receive data from different electronic data sources 310 and migrate the received data into a Netezza (NZ) database 304 using an information delivery platform (IDP) 302. The IDP 302 may comprise a Netezza database 304 and an operational data store (ODS) 306. More specifically, the analytic server may receive the data and load up the received data into Basel level 1 (L1) 312 of the NZ database 304. Due to the tight timeline, changes to the source system may be kept to the minimum. As a result, some sources may still have a feed for Basel, which is distinct from the strategic L1 feed. Exceptions may be required in such situations. The analytic server may perform enhancement on the Basel L1 data 312 to upgrade the received data from level 1 to level 3 (L3) 314 in step A 318. The L3 data 314 may be higher-level enhanced data that are more appropriate for complex calculation. The upgraded data may be in Basel staging L3 view 316 stored in a staging area. The staging area acts as a large "bucket" in which data from multiple source systems can be temporarily placed for further processing. The analytic server may copy the enhanced data to the ODS 306 in step B 320. The ODS 306 may comprise a Basel application 308. The analytic server may execute the Basal application 308 to perform various calculation functions in step C 322 to prepare and rationalize the data. The analytic server may copy back the calculation results to the NZ database 304 in step D 324. The Basel application 308 may interact with a risk calculator 328 and the calculation results may comprise risk parameters. The analytic server may store the calculation results to the Basel L3 views 330 of the NZ database 304. The analytic server may use common data model (CDM) 332 to generate reports for different consumers 334 in step E 326. After migrating the received data from different sources into the NZ database 304, the analytic server may have all data located in a single central hub with proper data linkage. The analytic server may decommission the legacy systems for data loading and the Basel application 308 for data rationalization.

For corporate and commercial (CC) instrument data, the analytic server may keep BWAR 336 out of scope of the Basel application and minimize changes to the Basel application component. The BWAR 336 may be an external function performing reconciliation, variance calculation/reclassification, and attestation. In addition, SS/HSS 338 may be out of the scope of the Basel application for CC instrument data. Instead, SS/HSS 338 may be a component for surrogate keys cutting for retail instrument data (discussed in FIG. 4), only if necessary.

Figure 4:
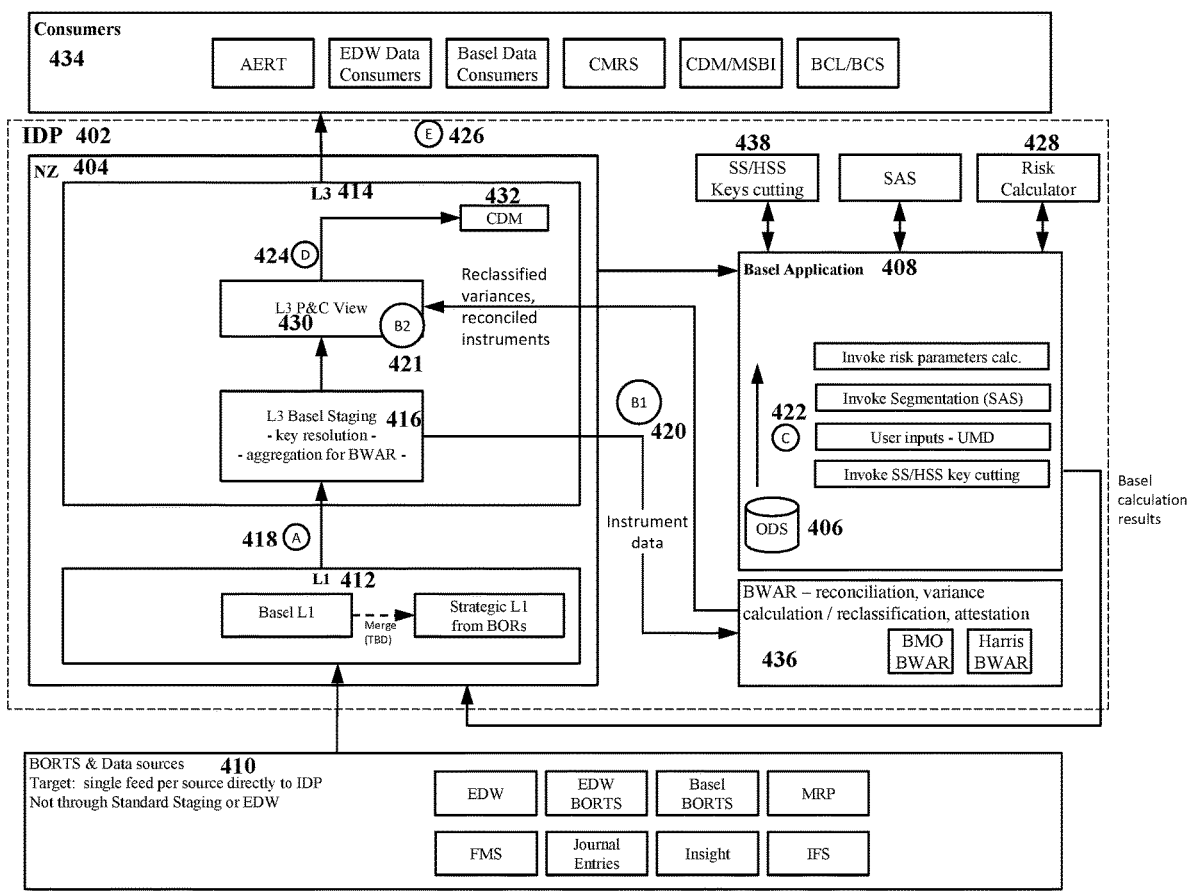
FIG. 4 illustrates a second example of data mart rationalization and mitigation, according to an embodiment.

FIG. 4 illustrates a second example of data mart rationalization and mitigation, according to an embodiment. This example may be a high-level solution architecture for retail Basel (P&C Basel).

The analytic server may receive data from different electronic data sources 410 and migrate the received data into a Netezza (NZ) database 404 using an information delivery platform (IDP) 402. The IDP 402 may comprise a Netezza database 404 and an operational data store (ODS) 406. More specifically, the analytic server may receive the data and load up the received data into Basel level 1 (L1) 412 of the NZ database 404. Due to the tight timeline, changes to the source system may be kept to the minimum. As a result, some sources may still have a feed for Basel, which is distinct from the strategic L1 feed. Exceptions may be required in such situations. The analytic server may perform enhancement on the Basel L1 data 412 to upgrade the received data from level 1 to level 3 (L3) 414 in step A 418. The L3 data 414 may be higher-level enhanced data that are more appropriate for complex calculation. The upgraded data may be in Basel staging L3 view 416 stored in a staging area. The staging area acts as a large "bucket" in which data from multiple source systems can be temporarily placed for further processing. The analytic server may leverage the existing stand-alone SS/HSS key cutting module 438 interfaced through batch files. The analytic server may port the majority of P&C Basel SS/HSS logics 438 to L3 Basel staging 416. The analytic server may transfer L3 Basel staging instrument data 416 to BWAR 436 for reconciliation in step B1 420. The analytic server may receive the BWAR results including reclassified variances, reconciled instruments. The analytic server may process the BWAR results and additional data from L3 Basel staging 416 to form the next level of L3 data, such as L3 P&C view data 430 in step B2 421. Furthermore, the analytic server may copy the enhanced data and/or reconciled data to the ODS 406. The ODS 406 may comprise a Basel application 408. The analytic server may execute the Basal application 408 to perform various calculation functions in step C 422 to prepare and rationalize the data.

The analytic server may copy back the calculation results to the NZ database 404. The Basel application 408 may interact with a risk calculator 428 and the calculation results may comprise risk parameters. The analytic server may store the calculation results to the Basel L3 views 430 of the NZ database 404. The analytic server may use common data model (CDM) 432 to simplify the creation, aggregation and analysis of data in step D 424. The analytic server may generate reports for different consumers 434 in step E 426. After migrating the received data from different sources into the NZ database 404, the analytic server may have all data located in a single central hub with proper data linkage. The analytic server may decommission the legacy systems for data loading and the Basel application 408 for data rationalization.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
    executing, by a server, a data enhancement protocol on data received from a plurality of electronic data sources having a plurality of legacy components, to generate enhanced data by tagging the received data with metadata corresponding to a source of origin and a timestamp of the received data, wherein each electronic data source is configured to generate calculation results based on data corresponding to that electronic data source using a legacy component of the plurality of legacy components, wherein the data includes a first set of data received from a first electronic data source of the plurality of electronic data sources has a first data format that is inconsistent with a second data format of a second set of data received from a second electronic data source of the plurality of electronic data sources, wherein the first set of data and the second set of data are tagged with a plurality of attributes corresponding to a database;
    replicating, by the server, the enhanced data into the database;
    executing, by the server, a basel application configured to perform a set of calculation functions on the enhanced data to generate risk parameters of calculation results by removing duplicated information, performing a netting allocation protocol, and creating at least one data linkage by associating relevant information within the enhanced data, the set of calculation functions comprises a key cutting protocol, the risk parameters comprising at least one of a probability of a default, loss given the default, or exposure at the default;
    replicating, by the server, the calculation results into the database;
    consolidating, by the server via the database using the replicated calculation results, the data received from each data source of the plurality of data sources into a third data format that is consistent with the first data format and the second data format; and
    decommissioning, by the server, each legacy component corresponding to each electronic data source.

2. The method of claim 1, further comprising:
    generating, by the server, an electronic report using a common data model based on calculation results in the database, wherein the common data model comprises a collection of data schemas representing commonly used concepts.

3. The method of claim 1, further comprising:
    decommissioning, by the server, the application for performing the set of calculation functions.

4. The method of claim 1, further comprising:
    rewriting, by the server, one or more extraction scripts according to extraction operation for generating an electronic report.

5. The method of claim 1, further comprising:
    storing, by the server, the received data as a first level in the database; and
    executing, by the server, the data enhancement protocol on the received data by upgrading the received data from the first level to a second level.

6. The method of claim 1, wherein the set of calculation functions further comprises transit mapping and the netting allocation protocol.

7. A system comprising:
    a database;
    a server having a processor in communication with the database, the server configured to:
        execute a data enhancement protocol on data received from a plurality of electronic data sources having a plurality of legacy components, to generate enhanced data by tagging the received data with metadata corresponding to a source of origin and timestamp of the received data, wherein each electronic data source is configured to generate calculation results based on data corresponding to that electronic data source using a legacy component of the plurality of legacy components, wherein a first set of data received from a first electronic data source of the plurality of electronic data sources has a first data format that is inconsistent with a second data format of a second set of data received from a second electronic data source of the plurality of electronic data sources, wherein the first set of data and the second set of data are tagged with a plurality of attributes corresponding to a database;

replicate the enhanced data into the database;

execute a basel application configured to perform a set of calculation functions on the enhanced data to generate risk parameters of calculation results by removing duplicated information, performing a netting allocation protocol, and creating at least one data linkage by associating relevant information within the enhanced data, the set of calculation functions comprises a key cutting protocol, the risk parameters comprising at least one of a probability of a default, loss given the default, or exposure at the default;

replicate the calculation results into the database;

consolidate, via the database using the replicated calculation results, the data received from each data source of the plurality of data sources into a third data format that is consistent with the first data format and the second data format; and decommission each legacy component corresponding to each electronic data source.

8. The system of claim 7, wherein the server is further configured to:

generate an electronic report using a common data model based on calculation results in the database, wherein the common data model comprises a collection of data schemas representing commonly used concepts.

9. The system of claim 7, wherein the server is further configured to:

decommission the application for performing the set of calculation functions.

10. The system of claim 7, wherein the server is further configured to:

rewrite one or more extraction scripts according to extraction operation for generating an electronic report.

11. The system of claim 7, wherein the server is further configured to:

store the received data as a first level in the database; and execute the data enhancement protocol on the received data by upgrading the received data from the first level to a second level.

12. The system of claim 7, wherein the set of calculation functions further comprises transit mapping and the netting allocation protocol.

13. A system comprising:

a non-transitory computer readable medium having a set of instructions that when executed by a processor, cause the processor to:

execute a data enhancement protocol on data received from a plurality of electronic data sources having a plurality of legacy components, to generate enhanced data by tagging the received data with metadata corresponding to a source of origin and timestamp of the received data, wherein each electronic data source is configured to generate calculation results based on data corresponding to that electronic data source using a legacy component of the plurality of legacy components, wherein a first set of data received from a first electronic data source of the plurality of electronic data sources has a first data format that is inconsistent with a second data format of a second set of data received from a second electronic data source of the plurality of electronic data sources, wherein the first set of data and the second set of data are tagged with a plurality of attributes corresponding to a database;

replicating, by a server, the enhanced data into the database;

executing, by the server, a basel application configured to perform a set of calculation functions on the enhanced data to generate risk parameters of calculation results by removing duplicated information, performing a netting allocation protocol, and creating at least one data linkage by associating relevant information within the enhanced data, the set of calculation functions comprises protocol, the risk parameters comprising at least one of a probability of a default, loss given the default, or exposure at the default;

replicate the calculation results into the database;

consolidate, via the database using the replicated calculation results, the data received from each data source of the plurality of data sources into a third data format that is consistent with the first data format and the second data format; and decommission each legacy component corresponding to each electronic data source.

14. The system of claim 13, wherein the server is further configured to:

generate an electronic report using a common data model based on calculation results in the database, wherein the common data model comprises a collection of data schemas representing commonly used concepts.

15. The system of claim 13, wherein the server is further configured to:

decommission the application for performing the set of calculation functions.

16. The system of claim 13, wherein the server is further configured to:

rewrite one or more extraction scripts according to extraction operation for generating an electronic report.

17. The system of claim 13, wherein the server is further configured to:

store the received data as a first level in the database; and execute the data enhancement protocol on the received data by upgrading the received data from the first level to a second level.

18. The system of claim 13, wherein the set of calculation functions further comprises transit mapping and the netting allocation protocol.

* * * * *